United States Patent [19]

Maddock

[11] Patent Number: 4,582,586
[45] Date of Patent: Apr. 15, 1986

[54] CHLORINE GAS INJECTION SYSTEM FOR SWIMMING POOL

[76] Inventor: Robert Maddock, Phoenix, Ariz.
[21] Appl. No.: 761,690
[22] Filed: Aug. 2, 1985
[51] Int. Cl.⁴ .............................................. C25C 7/00
[52] U.S. Cl. .................................................. 204/278
[58] Field of Search ................ 204/271, 277, 149, 278

[56] References Cited

U.S. PATENT DOCUMENTS

| | | | |
|---|---|---|---|
| 3,133,877 | 5/1964 | Mixer | 210/754 |
| 3,251,357 | 5/1966 | Williamson | 210/764 |
| 3,650,405 | 3/1972 | Morrison | 210/754 |
| 3,975,284 | 8/1976 | Lambert | 210/754 |
| 4,229,272 | 10/1980 | Yates | 204/129 |
| 4,290,873 | 9/1981 | Weaver | 204/271 |
| 4,361,471 | 11/1982 | Kosarek | 204/277 |

*Primary Examiner*—T. M. Tufariello
*Attorney, Agent, or Firm*—Drummond & Nissle

[57] ABSTRACT

Apparatus for injecting chlorine gas through a nozzle into a stream of water flowing past the nozzle. The nozzle is shaped and dimensioned to cause turbulent intermixing of water at the point chlorine gas leaves the nozzle and enters a stream of water. The turbulent intermixing of the water minimizes the likelihood that salts carried in the chlorine gas will crystallize in and block the flow of chlorine gas through the nozzle.

1 Claim, 5 Drawing Figures

U.S. Patent  Apr. 15, 1986  4,582,586
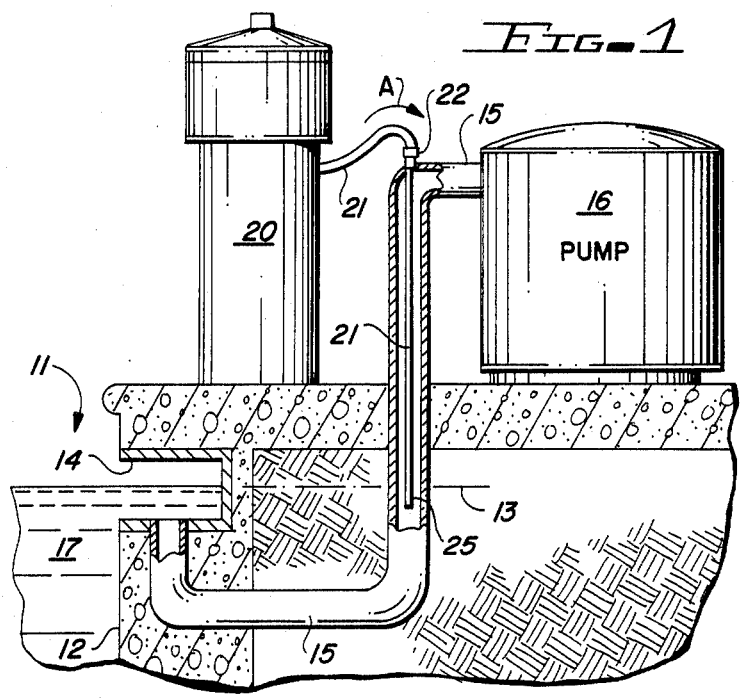
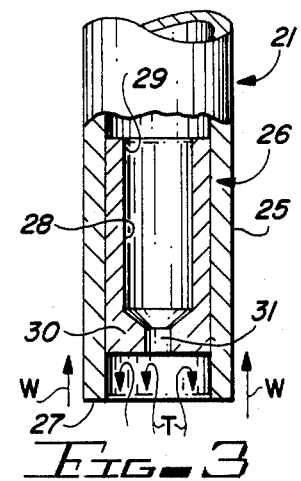
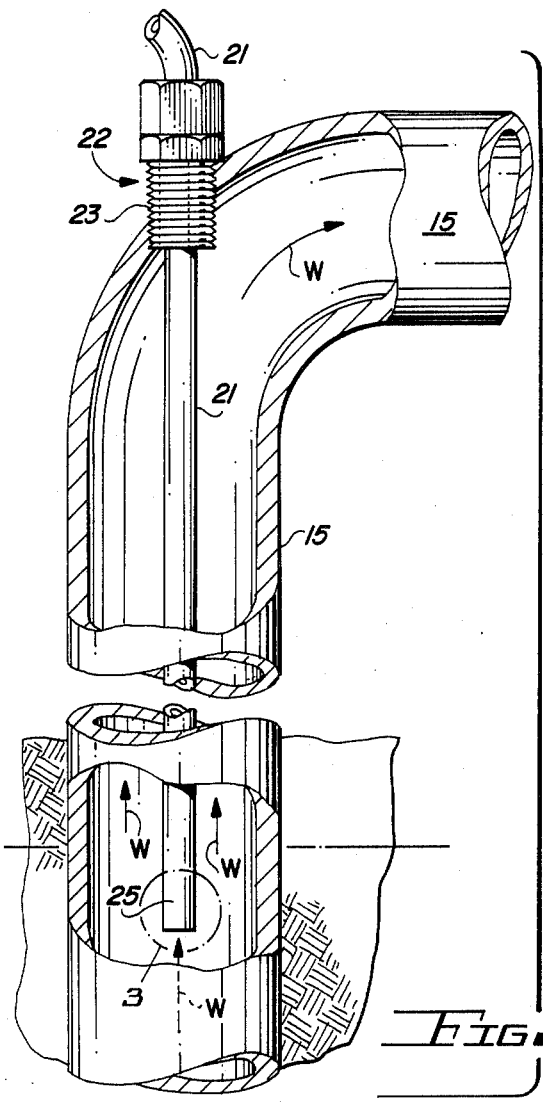
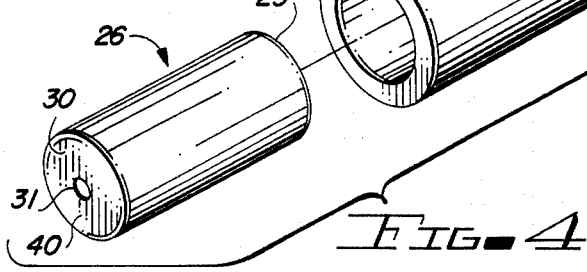
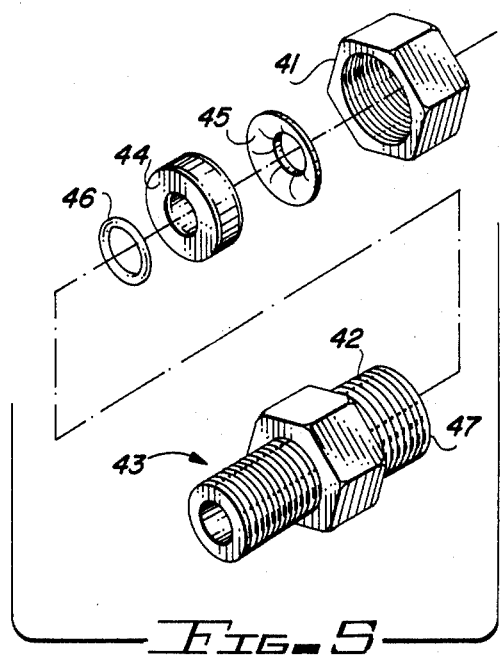

CHLORINE GAS INJECTION SYSTEM FOR SWIMMING POOL

This invention relates to systems for injecting chlorine gas into a water circulation system.

More particularly, the invention relates to a system in which chlorine gas produced by the electrolysis of salt and water is introduced under atmospheric pressure through a nozzle into water flowing through a conduit, the nozzle being positioned in the conduit to prevent the crystallization in the nozzle of salts carried in the chlorine gas.

In another respect, the invention relates to a chlorine gas injection system of the type described in which the nozzle is shaped and dimensioned to cause turbulent intermixing of the water minimizing the likelihood that salts carried in the chlorine gas will crystallize in and block the flow of chlorine gas through the nozzle.

Systems for injecting into water chlorine gas produced by the electrolysis of salt and water are well known in the art. See, for example, U.S. Pat. Nos. 3,133,877 to Mixer et al., 3,251,357 to Williamson, 3,650,405 to Morrison, 3,975,284 to Lambert and 4,229,272 to Yates. Since chlorine gas is highly toxic, it is important gas injection systems be designed to minimize the likelihood that the nozzle or other mechanism metering the flow of chlorine gas into a supply of water not be blocked, since blockage of the nozzle normally causes chlorine gas to accumulate in and eventually escape from the injection system into the ambient air. Conventional chlorine gas injection systems tend to become blocked due to the formation of calcium, salt and other mineral deposits in the nozzle directing chlorine gas into a water supply. In order to prevent the formation of such mineral deposits, existing systems often employ a venturi or other auxiliary means to generate pressure which accelerates the rate at which chlorine gas passes through an injection nozzle into water flowing past the nozzle. If such auxiliary pressure generating systems are not utilized in conjunction with conventional chlorine gas injection systems, the likelihood that salts carried in the chlorine gas will crystallize on or within the injection nozzle is increased.

Accordingly, it would be highly desirable to provide a chlorine gas injection system in which chlorine gas produced by the electrolysis of salt and water is directed through an injection nozzle into a stream of water without requiring the utilization of a venturi or other pressure differential system to insure that salt in the chlorine gas does not crystallize in and prevent chlorine gas from flowing through the injection nozzle.

Therefore, it is a principal object of the instant invention to provide an improved chlorine gas injection system.

Another object of the invention is to provide an improved chlorine gas injection system in which chlorine produced by the electrolysis of salt and water is injected under atmospheric pressure into water flowing through a conduit.

Still another object of the invention is to provide an improved chlorine gas injection system in which gas is injected through a nozzle into a stream of water flowing past the nozzle, the nozzle being shaped and dimensioned to create turbulent intermixing of water adjacent the nozzle to minimize the likelihood salt carried in the chlorine gas will crystallize on the nozzle and impede the flow of chlorine gas through the nozzle.

These and other, further and more specific objects and advantages of the invention will be apparent to those skilled in the art from the following detailed description thereof, taken in conjunction with the drawings, in which:

FIG. 1 is a front view of a chlorine gas injection system constructed in accordance with the principles of the invention and having portions thereof broken away to further illustrate construction details thereof;

FIG. 2 is an enlarged view of a portion of the chlorine gas injection system of FIG. 1;

FIG. 3 is a front section view of a portion of the chlorine gas injection system of FIG. 2 illustrating the injection nozzle thereof recessed in the tubing transporting chlorine gas to the nozzle;

FIG. 4 is a perspective assembly view of the injection nozzle and chlorine gas tubing of FIG. 3; and, FIG. 5 is a perspective assembly view of the seal assembly utilized to direct the chlorine gas tubing through the wall of water pump inlet conduit.

Briefly, in accordance with my invention, I provide improved apparatus for injecting chlorine gas into a water transport system for a reservoir, said system including improved apparatus for injecting chlorine gas into a water transport system for a reservoir. The water transport system includes a pump for drawing water from the reservoir, the reservoir being filled with water to a desired level therein; and, an inlet conduit leading from the reservoir to the pump. A portion of the inlet conduit extends downwardly below the desired water level of the reservoir and is normally filled with water to a level equivalent to the desired water level of the reservoir. The improved chlorine injection apparatus comprises apparatus for producing chlorine gas by electrolysis of salt and water; a gas delivery conduit leading from the chlorine gas producing apparatus to the inlet conduit and having a gas dispensing end positioned in the inlet conduit below the desired water level of the pool, chlorine gas passing through the conduit generally under atmospheric pressure; and, nozzle means recessed in the gas dispensing end of the delivery conduit and comprising a hollow member having an inner wall opening at one end and enclosed by a wall at the other end. The end wall has an aperture formed therethrough for dispensing chlorine gas from the gas delivery conduit into water flowing through the inlet conduit to the pump.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates a chlorine gas injection system for a water circulation system for a swimming pool 11. The swimming pool 11 includes a reservoir 12 filled with water 17 to a desired level 13. The water circulation system for the pool includes skimmer 14 from which inlet conduit 15 carries water to pump 16 to be filtered and recirculated back to reservoir 12. The portion of conduit 15 below dashed line 13 is positioned beneath the desired water level 13 of water in reservoir 12 and consequently is filled with water even when pump 16 is not operating. Unit 20 produces chlorine gas through the electrolysis of salt and water. Chlorine gas produced by unit 20 flows through flexible hose 21 in the direction of arrow A and into inlet conduit 15. Fitting assembly 22 is sealingly fitted into aperture 23 formed in the wall of conduit 15 (FIG. 2). The gas dispensing end 25 of hose 21 is positioned six to eight inches below the desired water level 13 of reservoir 12 such that end 25 is submerged in water even when pump 16 is not operating. Plastic nozzle 26 is slidably force fitted in gas dispensing end 25 of resilient conduit 21 and is recessed from lip 27 of conduit 21. Cylindrical nozzle 26 includes cylindrical inner wall 28 opening at end 29 and having end wall 30 at the other end. Aperture 31 is formed through wall 30 and preferably has a diameter of 0.020 to 0.032 inches. The minimum thickness of end wall 30 and, consequently, the height of aperture 31, is 0.015 to 0.025 inches, preferably 0.020 inches. The diameter of inner wall 28 is approximately one-eighth of an inch. The minimal height of chlorine gas metering aperture 31 (0.015 to 0.025 inch) is important in avoiding blockage of aperture 31 by the crystallization therein of salt carried in chlorine gas flowing through aperture 31 into inlet conduit 15. An aperture 31 of greater height or length has a greater tendency to be blocked by crystallized salt particles.

Water normally flows through conduit 15 in the direction indicated by arrows W in FIGS. 2 and 3. Recessing nozzle 26 in tube 21 away from edge 27 in the manner illustrated in FIG. 3 creates turbulent water flow near aperture 31 as indicated by arrows T in FIG. 3. The turbulent flow T tends to continually wash face 40 and aperture 31 of nozzle 26 and to prevent salt or mineral deposits from forming thereon. As would be appreciated by those of skill in the art, nozzle 26 and/or end 27 of conduit 21 can be variously shaped and dimensioned to produce turbulent intermixing of water adjacent aperture 31.

As illustrated in FIG. 5, seal assembly 22 for flexible conduit 21 includes internally threaded nut 41 which receives externally threaded end 42 of member 43. Rubber washer 44, lock washer 45, and 0-ring 46 are interposed be-tween end 47 and member 43 and the inner surface (not visible) of nut 41. Externally threaded end 50 of member 43 is sealingly turned into internally threaded aperture 23 formed in the wall of conduit 15.

In operation, apparatus 20, conduit 21, seal assembly 22, and nozzle 26 are installed in a water circulation system in the manner illustrated in FIGS. 1-5. Chlorine gas generating apparatus 20 and pump 16 are then operated. Chlorine gas produced by apparatus 20 travels through tube 21 generally at atmospheric pressure or at a pressure slightly less than atmospheric pressure, and then passes through aperture 31 into water flowing through conduit 15 in the direction of arrows W. The chlorine gas is intermixed with the water before the water reaches pump 16. Turbulent intermixing of water in the manner indicated by arrows T adjacent aperture 31 facilitates the intermixing of chlorine gas and water and also tends to prevent the crystallization of salt or other minerals in aperture 31.

Having described my invention in such terms as to enable those skilled in the art to which it pertains to understand and practice it, and having described the presently preferred embodiments and best mode thereof, I claim:

1. Apparatus for injecting chlorine gas into a water transport system for a reservoir, said system including
   a pump for drawing water from said reservoir, said reservoir being filled with water to a desired level therein,
   an inlet conduit leading from the reservoir to said pump, a portion of said inlet conduit extending downwardly below said desired water level of said reservoir and being normally filled with water to a level equivalent to said desired water level of said reservoir,
   said chlorine injection apparatus comprising,
   (a) apparatus for producing chlorine gas by electrolysis of salt and water;
   (b) a gas delivery conduit leading from said chlorine gas producing apparatus to said inlet conduit and having a gas dispensing end positioned in said inlet conduit below said desired water level of said pool, chlorine gas passing through said conduit generally under atmospheric pressure; and,
   (c) nozzle means recessed in said gas dispensing end of said delivery conduit and comprising a hollow member having an inner wall opening at one end and enclosed by a wall at the other end, said end wall having an aperture formed therethrough for dispensing chlorine gas from said gas delivery conduit into water flowing through said inlet conduit to said pump.

* * * * *